UNITED STATES PATENT OFFICE.

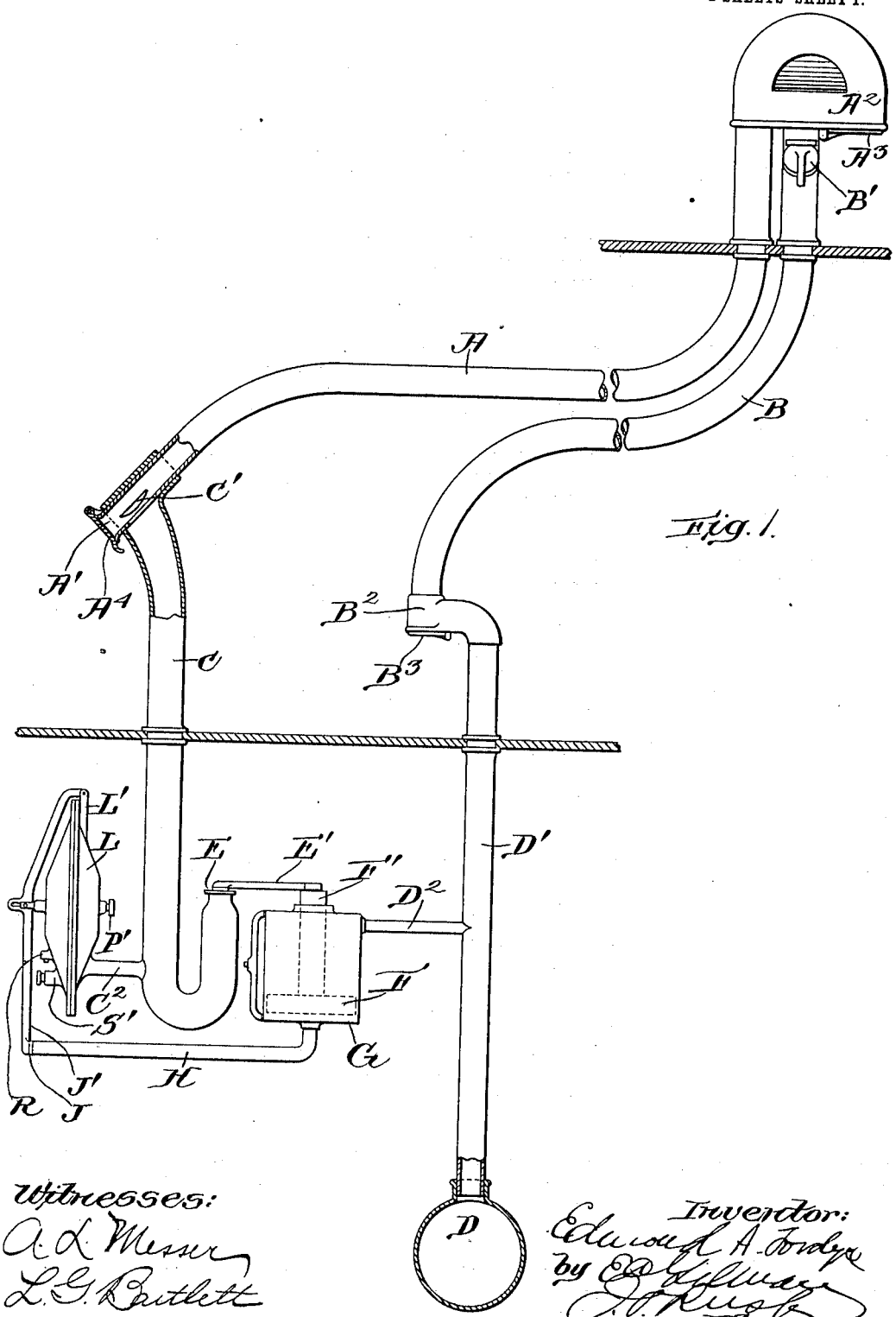

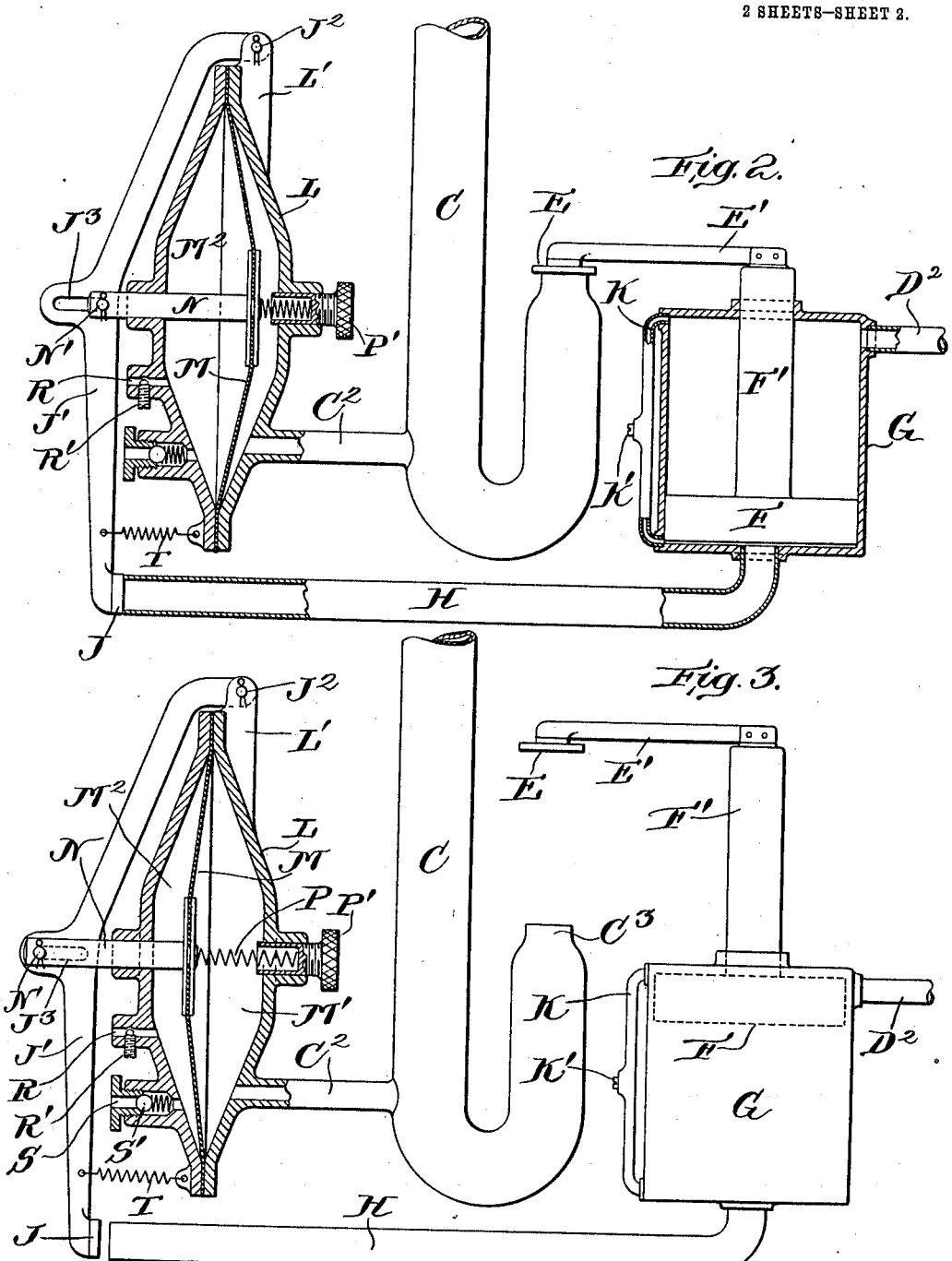

EDMOND A. FORDYCE, OF BOSTON, MASSACHUSETTS, ASSIGNOR, BY MESNE ASSIGNMENTS, TO AMERICAN PNEUMATIC SERVICE COMPANY, OF BOSTON, MASSACHUSETTS, A CORPORATION OF DELAWARE.

PNEUMATIC-DESPATCH-TUBE APPARATUS.

1,040,302.  Specification of Letters Patent.  Patented Oct. 8, 1912.

Application filed January 24, 1907, Serial No. 353,781. Renewed May 17, 1912. Serial No. 698,076.

*To all whom it may concern:*

Be it known that I, EDMOND A. FORDYCE, of Boston, in the county of Suffolk and State of Massachusetts, have invented certain new and useful Improvements in Pneumatic-Despatch-Tube Apparatus, of which the following is a specification.

The invention relates to pneumatic despatch tube systems, and more particularly to that class of system in which a vacuum is maintained in the transmission tubing, and the carriers are driven through the tube by the admission of air to the tubing back of the carrier. In this type of apparatus it is customary to provide a valve through which air is admitted to the transmission tube and to operate and control this valve in such manner that a reduction of pressure in the transmission tube will cause the valve to open and to remain open for a sufficient length of time for the transmission of a carrier from one station to another. The timing mechanism which determines the period during which air is admitted to the transmission tubing when the air valve is opened is commonly so constructed that it is set or rendered active upon the opening of the valve, and acts after a predetermined time to cause a closing of the valve. The timing mechanism is also commonly so constructed that it will be reset or partially reset by the momentary fluctuations in the pressure in the transmission tubing caused by the opening and closing of the discharge terminal as the carrier is discharged. This resetting or partial resetting of the timing mechanism causes the closing of the valve to be delayed beyond the interval requisite for the transmission of the carrier, and consequently results in a useless flow of air through the tubing, and an increase in the power required to operate the apparatus.

The principal feature of the present invention contemplates the provision of a timing mechanism for controlling the closing of the valve which will be set or reset upon the despatching of a carrier, but will not be reset upon the momentary fluctuations in the pressure in the tubing such as are produced by the discharge of the carrier. By providing a timing mechanism of this character, a proper supply of air to the transmission tubing for the requisite period after the despatching of each carrier is insured, and the timing mechanism may be accurately adjusted to secure the uniform closing of the valve immediately after the requisite transmission period has elapsed.

It is preferred to embody the above feature of the invention in an apparatus in which the valve opening mechanism is so controlled that its operation to open the valve depends upon a predetermined fluctuation in the pressure within the transmission tube such as occurs in the despatching of a carrier, and to so combine the valve opening and timing mechanism that such a predetermined fluctuation of the pressure in the transmission tube is required to reset the timing mechanism, and such construction and arrangement constitutes a further feature of the invention. With such construction the valve for admitting air to the transmission tube will be opened and the timing mechanism set upon the despatching of a carrier, and in case carriers are despatched in rapid succession so that the timing mechanism does not cause the closing of the valve between the despatch of successive carriers, the timing mechanism will be reset upon the despatch of each carrier. The valve will therefore remain open for the requisite period after the despatch of the last carrier to insure the transmission and discharge of said carrier. The momentary reduction of pressure in the transmission tube caused by the opening and closing of the discharge terminal upon the discharging of the carrier will not, however, effect a resetting of the timing mechanism or affect its action so as to delay the closing of the valve beyond the period required for the transmission of the carrier and its discharge. Neither will any momentary fluctuation in the pressure within the transmission tube such as might be caused by the accidental opening of a terminal or the discharge of a carrier cause an opening movement of the valve operating mechanism.

The specific construction and arrangement of the parts of the valve operating and timing mechanisms and relative arrangement of these mechanisms are not material to the invention in its broader aspects, and may be changed and modified as found desirable or best suited to the conditions under which the apparatus in which the invention is embodied is to be used.

In addition to the features above referred to the invention includes certain features of construction and arrangement which will be referred to in the claims and which, while they are not essential to the invention in its broader aspects, are of advantage in contributing to the efficiency and simplicity of an apparatus embodying the broader features.

The invention will be readily understood from the accompanying drawings, in which—

Figure 1 is a side elevation of a pneumatic despatch tube apparatus in operating connection with the device; Fig. 2 is an enlarged view of the controlling mechanism shown in Fig. 1 and partly in section; and Fig. 3 is an enlarged view of the controlling mechanism partly in section showing the parts in operating position.

Like letters of reference refer to like parts throughout the several views.

A represents a tube for the transmission of carriers and connecting the bell mouth or carrier inlet A' with the downward discharge terminal $A^2$ controlled by an ordinary discharge valve $A^3$. The bell mouth A' is controlled by a valve $A^4$. The transmission tube B for the return of carriers connects said terminal $A^2$ with the discharge terminal $B^2$ controlled by the valve $B^3$. The carrier inlet of said tube B is controlled by a valve B' of usual construction. Connecting the terminal $B^2$ with the vacuum drum D is a tube D'. Connecting with the bell mouth A' and communicating therewith through ports C' is an air supply tube C, the opening at the lower end of which is normally closed by the valve E which valve is fixed to the arm E' mounted on the upper end of the piston rod F' connected with and operated by the piston F. The cylinder G within which the piston F operates is connected at its upper end above the piston F by means of a tube $D^2$ with the vacuum tube D'. The lower end of the cylinder G is connected below the piston F with a pipe H, the outer end of which is normally closed to the atmosphere by a valve J.

Connecting the upper and lower chambers of the cylinder G is a bypass K regulated by the adjustable timing screw K'. The valve J is mounted upon one end of a lever J' which lever is pivoted at its opposite end at $J^2$ to an extension L' on the top of the diaphragm casing L. Mounted centrally within the casing L and secured at its outer edge thereto is a diaphragm which has attached thereto on one side the rod N one end of which straddles a lever J' and carries the pin N' adapted to operate in the slot $J^3$ in the lever J. Mounted against the opposite side of the diaphragm M is a spring P, the tension of which is adjusted by a screw P'. The chamber M' on one side of the diaphragm M is connected with the tube C by a pipe $C^2$. The chamber $M^2$ on the opposite side of the diaphragm M communicates with the atmosphere through an air outlet R controlled by a screw valve R'. The said chamber $M^2$ also has an air inlet S controlled by the adjustable ball check valve S'. A spring T connecting the lower end of the lever J' with the lower part of the diaphragm casing L holds the valve J normally closed.

The operation is as follows: The operator desiring to despatch a carrier from the bell mouth A' to the terminal $A^2$ opens the valve $A^4$ and inserts the carrier into the bell mouth. The opening of the valve $A^4$ temporarily destroys the vacuum maintained in the tube C and in the diaphragm chamber M' so that the diaphragm is moved toward the left in Fig. 2 by the force of the spring P. The movement of the diaphragm is resisted by the air in the chamber $M^2$, the escape of which through the restricted outlet R is controlled by the screw R'. In despatching a carrier the valve $A^4$ remains open a sufficient length of time for the diaphragm M to move from the position indicated in Fig. 2 to the position indicated in Fig. 3 against the resistance offered by the air within the chamber $M^2$. During the first part of the movement of the diaphragm the pin N' moves idly in the slot $J^3$ of the lever J' and this movement of the diaphragm has no effect upon the valve J which controls the admission of air to the pipe H. When the pin N' reaches the outer end of the slot $J^3$ the continued movement of the diaphragm M moves the lever J' against the tension of the spring T, thus opening the valve J and admitting air to the pipe H and through it to the under side of the piston F. The piston F is then forced to the upper end of the cylinder G, thus opening the air valve E as indicated in Fig. 3, and admitting air to the supply tube C and through it to the transmission tube back of the carrier. When the carrier is inserted in the end of the transmission tube by the operator the valve $A^4$ is immediately closed and the air admitted through the supply pipe C drives the carrier forward through the tube. The closing of the valve $A^4$ and the travel of the carrier causes a partial vacuum or reduction of pressure in the supply tube C, since the opening $C^3$ is of less area than the bell mouth A. This reduction of pressure in the supply pipe C causes a reduction of pressure in the chamber M' so that the diaphragm M is moved back against the tension of the spring P to the position shown in Fig. 2, air being freely admitted to the chamber $M^2$ at this time through the check valve S'. This movement of the diaphragm M allows the valve J to return to closed position, cutting off communication between the lower end of the cylinder G and the atmosphere. The piston F now gradually falls as the air below the piston passes through the restricted passage K from the lower to the upper side of the cylinder G, the flow of air through the passage being regulated by the screw K'. The downward movement of the piston closes the valve E, cutting off the supply of air to the transmission tube. The time required for the piston to thus close the valve is regulated so that the valve will remain open for the period requisite for the travel of a carrier from the bell mouth A to the discharge terminal A² or from the despatching terminal B' to the discharge terminal B². In case a second carrier is despatched before the piston F has descended sufficiently to close the valve E the reduction of pressure in the transmission tube caused by the despatching of the second carrier will again operate the diaphragm M to open the valve J and thus return the piston F to the upper end of the cylinder G, thus resetting the timing mechanism so that the closing of the valve E will be delayed until the requisite period has elapsed for the transmission and discharge of this second carrier. When a carrier is discharged the opening and closing of the valve at the discharge terminal causes a momentary reduction of pressure in the transmission tube which may cause a slight movement of the diaphragm M. This reduction in pressure is not of sufficient duration, however, to move the diaphragm M far enough to bring the pin N' against the outer end of the slot J³ in the lever J', and will not therefore cause an opening of the valve J and a resetting of the timing mechanism. The provision for lost motion between the diaphragm M and the lever J', therefore, prevents the fluctuation in pressure produced by the discharge of the carrier from affecting the timing mechanism. The provision for this lost motion also prevents a momentary fluctuation of the pressure in the transmission tube from causing a valve opening movement of the valve operating mechanism.

Having described the nature and object of the invention, and specifically described one form of apparatus in which it may be embodied, what I claim is:—

1. A pneumatic despatch tube apparatus, having, in combination, a normally closed tube for the transmission of carriers, a sending station for inserting carriers into said tube, means for exhausting air from said tube, an air inlet port adapted to admit air for driving carriers, a valve controlling said air inlet port, mechanism adapted to operate said valve and normally holding said valve closed, a sub air inlet port controlling the admission of air for operating said mechanism, a valve controlling said sub air inlet port, and a diaphragm-motor communicating on one side with the external air and on the other side with said transmission tube and adapted to be operated through a determined degree of fluctuation of the pressure within said tube for opening said sub inlet port valve to admit air for operating said mechanism whereby air is admitted to said tube for driving carriers, substantially as described.

2. A pneumatic despatch tube apparatus, having, in combination, a normally closed tube for the transmission of carriers, a sending station for inserting carriers into said tube, means for exhausting air from said tube, an air inlet port adapted to admit air for driving carriers, a valve controlling said air inlet port, mechanism adapted to operate said valve and normally holding said valve closed, a sub air inlet port controlling the admission of air for operating said mechanism, a valve controlling said sub air inlet port, a diaphragm-motor communicating on one side with the external air and on the other side with said transmission tube and adapted to be operated through a determined degree of fluctuation of the pressure within said tube for opening said sub air inlet port valve to admit air for operating said mechanism whereby air is admitted to said tube for driving carriers, and means normally actuating the closing of said sub inlet port valve for permitting the closure of the air inlet port by said mechanism, substantially as described.

3. A pneumatic despatch tube apparatus, having, in combination, a normally closed tube for the transmission of carriers, a sending station for inserting carriers into said tube, means for exhausting air from said tube, an air inlet port adapted to admit air for driving carriers, a valve controlling said air inlet port, mechanism adapted to operate said valve and normally holding said valve closed, a sub air inlet port controlling the admission of air for operating said mechanism, a valve controlling said sub air inlet port, a diaphragm-motor communicating on one side with the external air and on the other side with said transmission tube and adapted to be operated through a determined degree of fluctuation of the pressure within said tube for opening said sub air inlet port valve to admit air for operating said mechanism whereby air is admitted to said tube for driving carriers, means normally actuating the closing of said sub inlet port valve for permitting the closure of said air inlet port by said mechanism, and means for timing the closure of said air inlet port, substantially as described.

4. A pneumatic despatch tube apparatus, having, in combination, a normally closed tube for the transmission of carriers, a sending station for inserting carriers into said tube, means for exhausting air from said tube, an air inlet port adapted to admit air for driving carriers, a valve controlling said air inlet port, mechanism adapted to operate said valve and normally holding said valve closed, a sub air inlet port controlling the admission of air for operating said mechanism, a valve controlling said sub air inlet port, a diaphragm-motor communicating on one side with the external air and on the other side with said transmission tube and adapted to be operated by a fluctuation of the pressure within said tube upon the despatching of a carrier for opening said sub inlet port to admit air for operating said mechanism whereby air is admitted to said tube for driving carriers, and means for controlling and limiting the opening of said sub inlet port valve and the operating of the mechanism upon a fluctuation of pressure within the tube upon the delivery of a carrier, substantially as described.

5. A pneumatic despatch tube apparatus, having, in combination, a normally closed tube for the transmission of carriers, a sending station for inserting carriers into said tube, means for exhausting air from said tube, an air inlet port adapted to admit air for driving carriers, a valve controlling said air inlet port, mechanism adapted to operate said valve and normally holding said valve closed, a sub air inlet port controlling the admission of air for operating said mechanism, a valve controlling said sub air inlet port, a diaphragm-motor communicating on one side with the external air and on the other side with said transmission tube and adapted to be operated through a determined degree of fluctuation of the pressure within said tube for opening said sub air inlet port valve to admit air for operating said mechanism whereby air is admitted to said tube for driving carriers, and means normally actuating the immediate closure of said sub air inlet port valve for permitting the closure of the air inlet port by said mechanism, substantially as described.

In testimony whereof, I have signed my name to this specification in the presence of two subscribing witnesses, this tenth day of January A. D. 1907.

EDMOND A. FORDYCE.

Witnesses:
 MARY G. SMITH,
 L. G. BARTLETT.

Copies of this patent may be obtained for five cents each, by addressing the "Commissioner of Patents, Washington, D. C."